(12) United States Patent  (10) Patent No.: US 9,378,399 B2
Zhang et al.  (45) Date of Patent: Jun. 28, 2016

(54) GROUPING TRANSPONDERS

(71) Applicant: HAND HELD PRODUCTS, INC., Fort Mill, SC (US)

(72) Inventors: Zhenjun Zhang, Jiangsu (CN); Ynjiun Paul Wang, Cupertino, CA (US); Larry Ramsey-Macomber, Fairport, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 376 days.

(21) Appl. No.: 13/854,603

(22) Filed: Apr. 1, 2013

(65) Prior Publication Data

US 2014/0292499 A1  Oct. 2, 2014

(51) Int. Cl.
*H04Q 5/22* (2006.01)
*G06K 7/10* (2006.01)
*G07C 9/00* (2006.01)

(52) U.S. Cl.
CPC ........ *G06K 7/10009* (2013.01); *G07C 9/00111* (2013.01)

(58) Field of Classification Search
USPC ..................... 340/5.92, 10.52, 10.32; 235/383
See application file for complete search history.

(56) References Cited

U.S. PATENT DOCUMENTS

| | | | |
|---|---|---|---|
| 2005/0061870 A1* | 3/2005 | Stockton | 235/380 |
| 2006/0202032 A1* | 9/2006 | Kricorissian | 235/435 |
| 2008/0065496 A1* | 3/2008 | Fowler | G06Q 20/20 705/16 |
| 2008/0198012 A1* | 8/2008 | Kamen | 340/572.1 |
| 2008/0308630 A1* | 12/2008 | Bhogal et al. | 235/383 |
| 2011/0298590 A1* | 12/2011 | Lee et al. | 340/10.3 |

* cited by examiner

*Primary Examiner* — Fekadeselassie Girma
*Assistant Examiner* — Thomas McCormack
(74) *Attorney, Agent, or Firm* — Oliff PLC; R. Brian Drozd

(57) ABSTRACT

Methods and systems of processing transponder signals received from transponders to identify the transponders are provided. A first signal including a first code and a first identifier may be received from a first transponder. The first identifier is written to the first transponder by an RFID writer when the first transponder is placed proximate to the RFID writer, and the first identifier is used to associate transponders with a first user. A second signal including a second code and the first identifier may be received from a second transponder. The first identifier is also written to the second transponder by the RFID writer when the second transponder is placed proximate to the RFID writer. The first and second transponders are associated with the first user based on receiving the first identifier from both the first and second transponders.

20 Claims, 4 Drawing Sheets

GROUPING TRANSPONDERS

BACKGROUND

Many businesses, such as supermarkets, place barcodes on products for sale to identify the products at checkout. However, at checkout, each product barcode must be located, orientated to the barcode scanner, and then individually scanned by the barcode scanner. This process can sometimes cause significant delays and long checkout lines. Additionally, sometimes for large items, it is difficult to even find the attached barcode. Further, barcodes sometimes won't scan and thus, the cashier has to manually enter the code into the computer. Nonetheless, customers may get frustrated with long lines at checkout and decide not to purchase the items they came for originally, thereby causing the business to lose business.

SUMMARY

To address the above issues, an RFID system is provided which allows for scanning of multiple transponders (e.g., RFID tags) at the same time. Each of a plurality of users selects a different RFID writer. Each RFID writer has a unique identifier so that when a user selects items he is interested in, the RFID writer writes the unique identifier to items' transponders selected by the user. When the user is ready to check out, an RFID reader may read the transponders of the user-selected items simultaneously. Because the user's RFID writer writes an identifier that is different than other RFID writers, the RFID reader can distinguish between the user's selected items from other items (e.g., items from another user in the checkout line).

In one embodiment, a method of processing transponder signals received from transponders to identify the transponders is provided. A first signal including a first code and a first identifier may be received from a first transponder. The first identifier is written to the first transponder by an RFID writer when the first transponder is placed proximate to the RFID writer, and the first identifier is used to associate transponders with a first user. A second signal including a second code and the first identifier may be received from a second transponder. The first identifier is also written to the second transponder by the RFID writer when the second transponder is placed proximate to the RFID writer. The first and second transponders are associated with the first user based on receiving the first identifier from both the first and second transponders.

In another embodiment, an RFID reader may include an antenna to receive transponder signals, and a processing logic coupled to the antenna. The processing logic is configured to receive, from a first transponder, a first signal comprising a first code and a first identifier. The first identifier is written to the first transponder by an RFID writer when the first transponder is placed proximate to the RFID writer, and the first identifier is used to associate transponders with a first user. The processing logic is configured to receive, from a second transponder, a second signal comprising a second code and the first identifier. The first identifier is also written to the second transponder by the RFID writer when the second transponder is placed proximate to the RFID writer. The first and second transponders are associated with the first user based on receiving the first identifier from both the first and second transponders.

In yet another embodiment, a communication system is provided. The communication system may include a first RFID writer and a second RFID writer. The first RFID writer may be configured to be associated with a first user and to write a first identifier to transponders that come into a range of the first RFID writer. The second RFID writer may be configured to be associated with a second user and to write a second identifier to transponders that come into a range of the second RFID writer. A RFID reader may receive, from a first transponder, a first signal comprising the first identifier; receive, from a second transponder, a second signal comprising the first identifier; and receive, from a third transponder, a third signal comprising the second identifier. The RFID reader may group the first transponder and second transponder as being associated with a first user due to being associated with the first identifier. The RFID reader may associate the third transponder with a second user due to being associated with the second identifier.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of embodiments of the invention. In the drawings, like numerals are used to indicate like parts throughout the various views.

DETAILED DESCRIPTION OF THE EMBODIMENTS

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Examples of the invention include various methods and apparatuses for writing a unique identifier to a set of transponders (e.g., radio-frequency identification (RFID) tags) to associate the set of transponders with a specific user (e.g., a customer at a store). This allows users to have their respective associated items be distinguishable from each other. For example, a customer may enter a store and select a personal RFID writer. The customer then selects items the customer wants to purchase and places such items proximate to the customer's RFID writer. The RFID writer then writes a unique identifier to the transponder of each item. This unique identifier is only associated with the customer's RFID writer to distinguish the customer's selected products from other item in the store. In this regard, when a customer "checks out" at the store, all items with transponders having the customer's associated unique identifier will be purchased by the customer. Other items that inadvertently get scanned that may have a different identifier are immediately known to not have been selected by the customer and thus, the customer may not be charged for such item.

Examples of the invention find ready application in settings where RFID tags are placed on products for sale. These settings may include, for example, supermarkets, retail stores, hardware stores, and any other stores that have products that typically are scanned individually at checkout. It should be understood that, while examples of the present invention are discussed herein with regard to shopping by a customer, the present invention may not be so limited and could be applied to various other applications.

Figure 1:
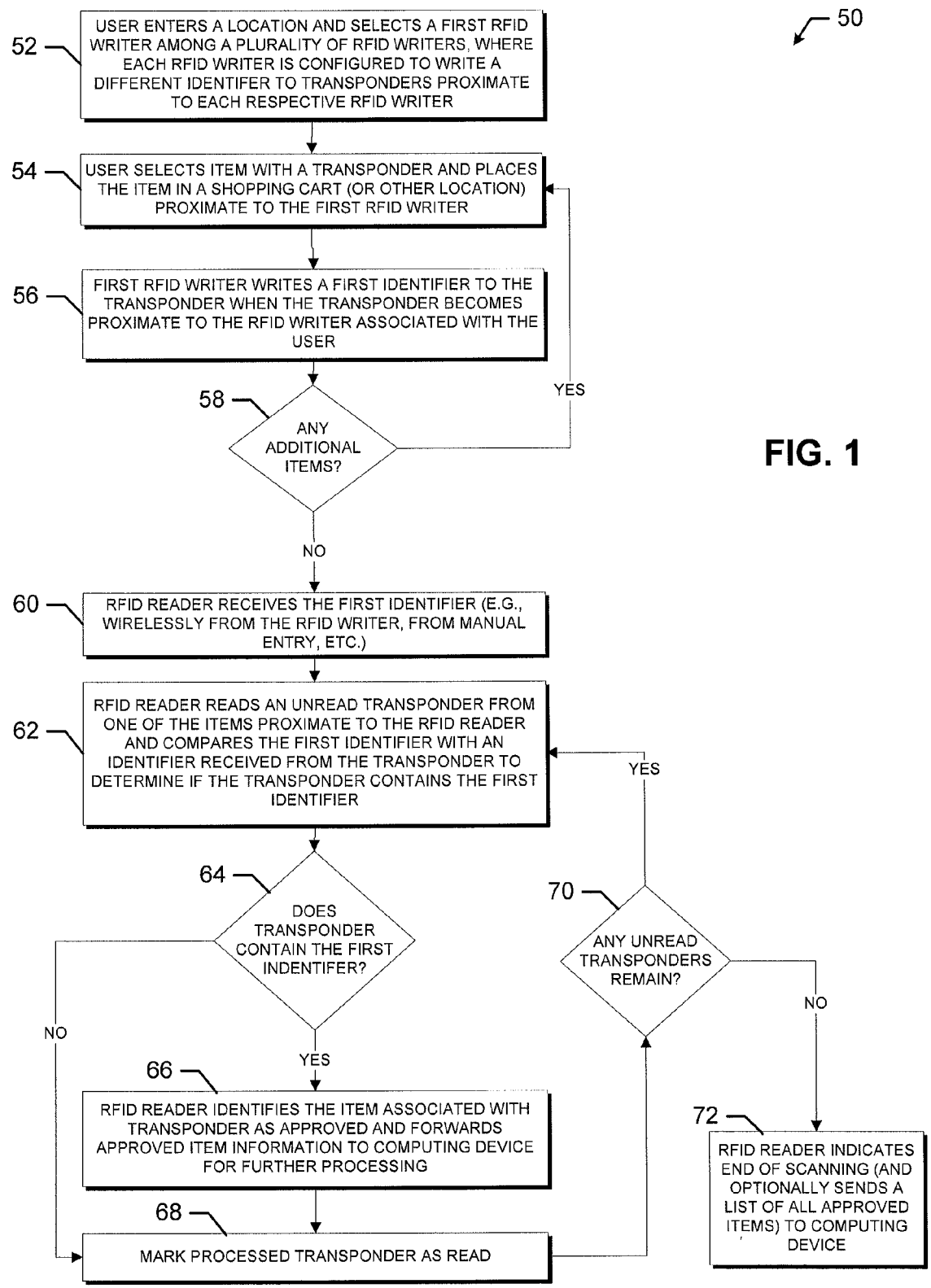
FIG. 1 illustrates a method of operating an RFID system employing RFID writers in accordance with one embodiment.

FIG. 1 illustrates a method 50 of operating an RFID system with RFID writers in accordance with one embodiment. At 52, a user enters a location and selects a first RFID writer. The location may include a plurality of RFID writers to accommodate a plurality of users. Each user selects a different RFID writer so that no user has the same RFID writer, and because each RFID writer is configured to write a different identifier to transponders, each user is associated with a unique identifier.

It should be understood that the term "user" may be any person or device which selects items that have transponders. In one embodiment, a user may be a customer in a store.

Additionally, it should be understood that a transponder may be any device which is configured to transmit a code to a wireless reader, such as an RFID reader. In one embodiment, a transponder is an RFID tag, which may be used to automatically identify objects. RFID tags are generally placed on items using an automatic tag applicator, and then the items are identified by one or more RFID readers.

Regardless, the first RFID writer selected by the user is placed proximate to the user. In one embodiment, the first RFID writer is placed on a shopping cart/basket associated with the user. The first RFID writer may be placed in a central location of the shopping cart or basket, such as on a base portion of the shopping cart or basket, so that the range of the RFID writer does not significantly extend beyond the limits of the shopping cart or basket. This allows for each RFID writer to only be associated with one shopping cart or basket and not overlap with other RFID writers. In other embodiments, the RFID writer may be placed at any other location, such as other locations in the shopping cart or basket (e.g., on the handle), on the user (e.g., on the user's key chain), or any other location proximate to the user so that the user can browse and select items throughout the location/store while being in possession of the RFID writer.

At 54, a user selects an item (e.g., products for sale in a store) and places the item proximate to the user's RFID writer (i.e., the first RFID writer). Each selected item may have a transponder attached thereto or associated therewith. A user can select the item by moving the item from a first location (e.g., a store shelf) to the user's shopping cart or basket (or other location) so that the item's transponder is proximate (e.g., within one to twelve inches) to the first RFID writer of the user. Regardless, when the user places the transponder of the item proximate to the RFID writer (e.g., within a range of one to twelve inches), the first RFID writer then writes the unique identifier to the transponder. The transponder then not only has the code identifying specifics of the item, but also the unique identifier which is associated with the user. The item is then associated with the user through the item's transponder.

Figure 2:
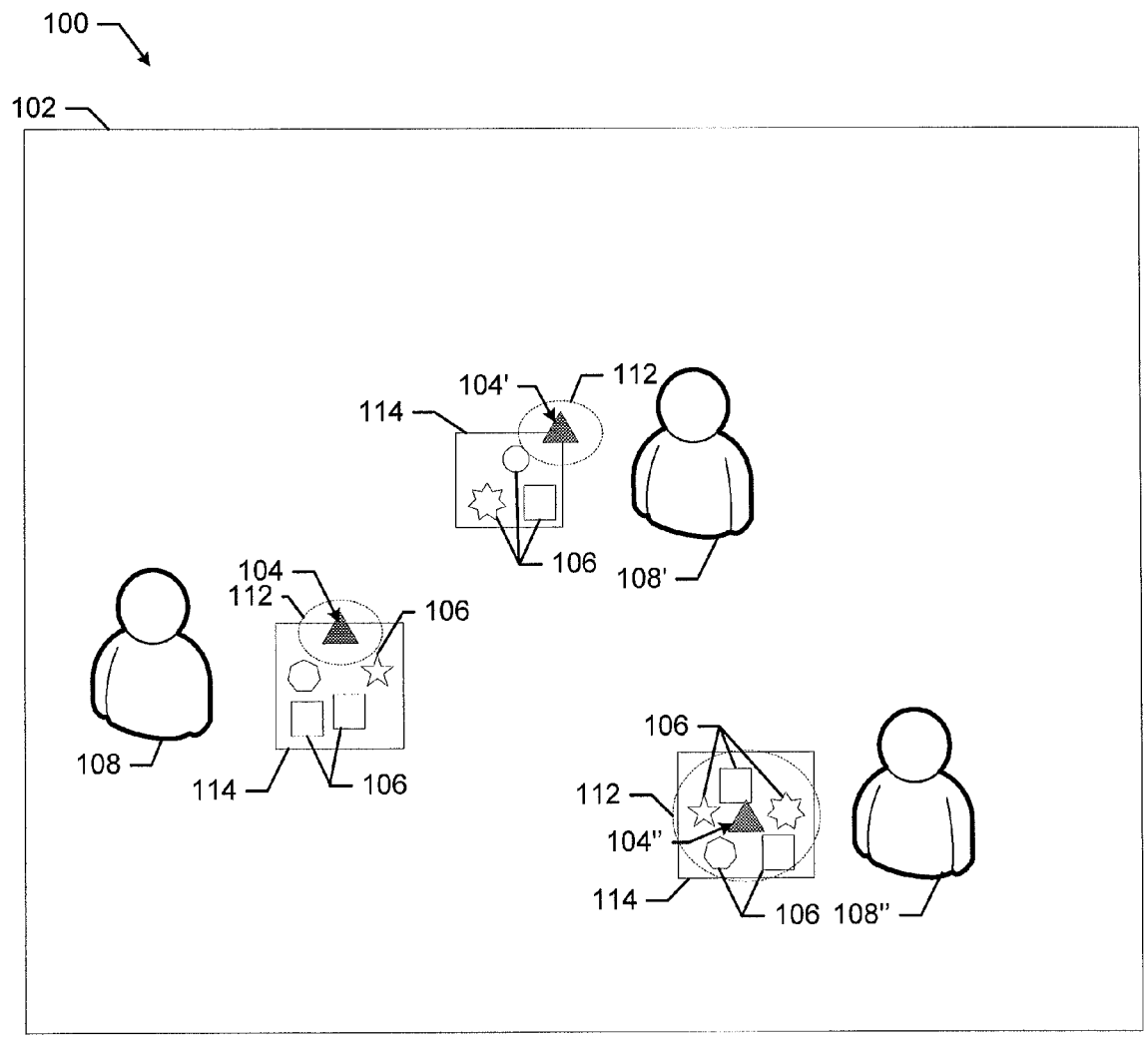
FIG. 2 illustrates an example of a system employing multiple RFID writers according to one embodiment.

As mentioned above, a location or store can have multiple users and RFID writers as long as each RFID writer is configured to write a different identifier for each user. FIG. 2 illustrates an example of a system 100 employing multiple RFID writers 104 according to one embodiment. At least three users 108 are illustrated as shopping in a store 102. Each user 108, 108', 108" has selected three RFID writers 104, 104', 104", respectively, and a shopping cart or basket 114. A first RFID writer 104 is associated with a first customer 108, a second RFID writer 104' is associated with a second customer 108', and a third RFID writer 104" is associated with a third customer 108". Each RFID writer is configured to write a unique identifier to transponders 106 when the transponders are selected by the customers and placed proximate to the RFID writer (e.g., within the range 112 of the closest RFID writer), as discussed above. This allows a customer to select items when shopping (or performing some other function) and have the transponders of the customer's items have a common unique identifier that is different than the identifiers written to transponders for other customers. In this regard, when a user "checks out" at the store, all items with transponders having that user's unique identifier will be purchased by the user, but not any other items.

It should be noted that in FIG. 2, the RIFD writer may be located at multiple locations on the shopping cart or basket 114. For example, the first RFID writer 104 is placed on top of a central portion the shopping cart or basket. This allows the customer 108 to place the object next to first RFID writer 104 and then drop the object in the cart/basket. In another embodiment illustrated in FIG. 2, the second RFID writer 104' is placed on top of the cart/basket 114 and on a portion of the cart/basket 114 that is closest to the user 108'. This allows the user 108' to have RFID writer 104' within a short, proximate distance relative to the user 108' when the user 108' is shopping. In a third embodiment illustrated in FIG. 2, the third RFID writer 104" is placed at a central location of the cart/basket. In this way, the range 112 of the third RFID writer 104" does not substantially extend outside of the cart/basket 114. Additionally, the range 112 may be such that a user simply places the item in the cart/basket and the RFID writer automatically writes to the transponders placed therein. It should be understood that the RFID writer 104 may be placed at any other location in the cart/basket 114 or at some other location on another object/person.

Referring back to FIG. 1, at 56, the first RFID writer writes a first identifier to the transponder when the transponder becomes proximate to the first RFID writer, such as when the transponder is placed within range 112 of the first RFID writer. As mentioned above, each RFID writer has a range whereby the RFID writer can write to a transponder. In one embodiment, range 112 of each RFID writer may be between one inch to twelve inches. Additionally, the frequency of each RFID writer may be between 50 KHz to 5 MHz. In one embodiment, the frequency of each RFID writer may be 125 KHz. Each RFID writer may not write the unique identifier to any transponders which are outside the RFID range. Operation of the RFID writer is illustrated in FIG. 3, in accordance with one embodiment.

Figure 3:
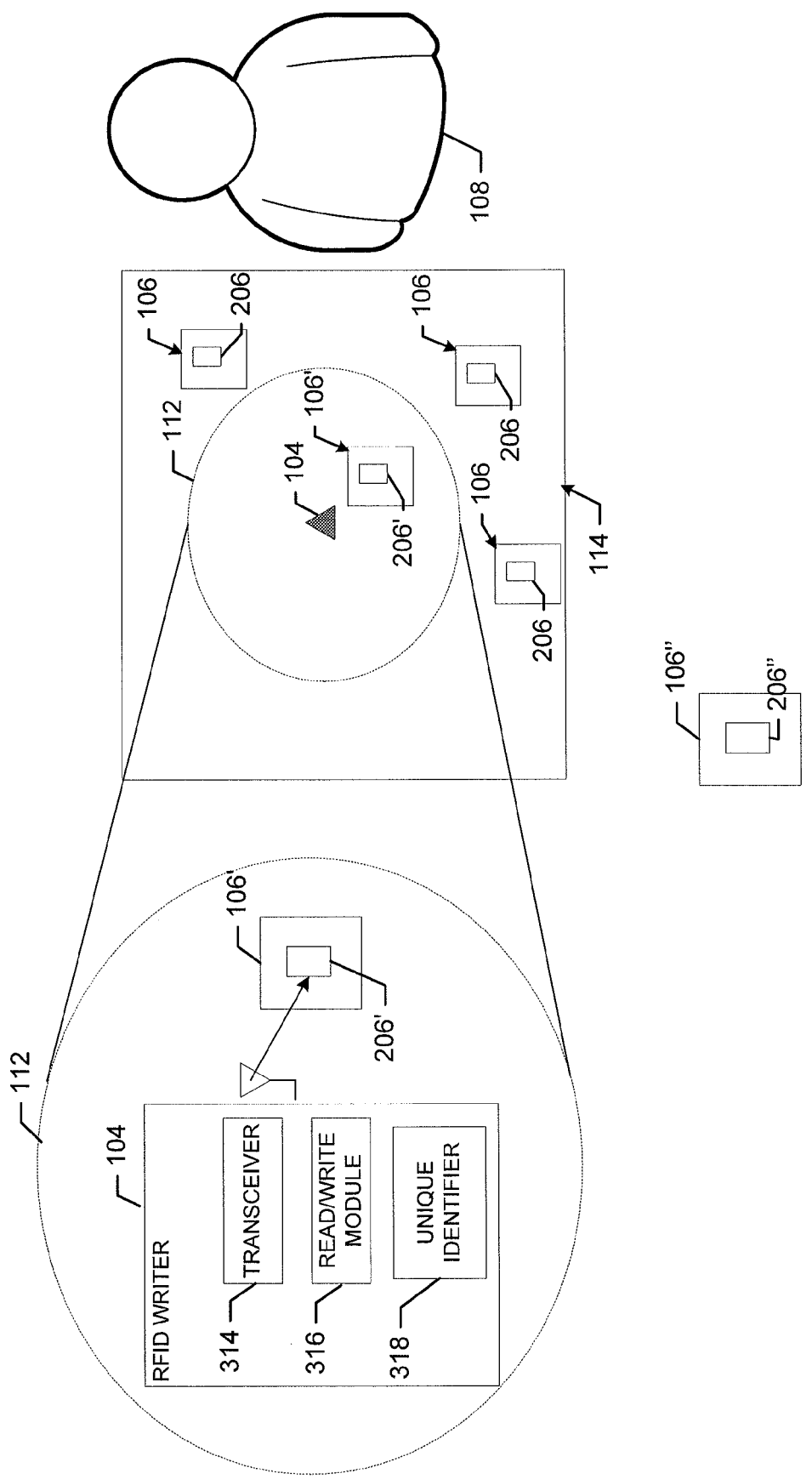
FIG. 3 illustrates a diagram of a system of an RFID writer writing to transponders within the RFID writer range, according to one embodiment.

FIG. 3 illustrates a diagram of a system of an RFID writer 104 writing to transponders 106 within the RFID writer range 112 of a user 108, according to one embodiment. RFID writer 104 includes an antenna, a transceiver 314, a read/write module 316, and a unique identifier 318 stored in memory. As illustrated in FIG. 3, transponder 106' is within RFID range 112, while transponders 106', 106" are outside of range 112. The transponders of FIG. 3 include memory 206 where a code associated with the transponder is stored. The code of each transponder identifies the item it is attached thereto. For example, a transponder attached to a shirt has a code which identifies the shirt and other data associated with the shirt, such as the shirt price, an SKU number, and/or any other information about the shirt. The transponder code is capable of being modified to add or change the data therein. In one embodiment, a unique identifier may be added as a prefix to the code of the transponder by the RFID writer. In another embodiment, the unique identifier does not modify the code but instead is saved as an additional code in the transponder. Regardless, when an RFID reader queries the transponder, the transponder may transmit back to the RFID reader both the code and the unique identifier.

The antenna of the RFID writer is designed to transmit a signal to a transponder which instructs the transponder to write the unique identifier to the transponder, such as a prefix to the previously-stored code. The transponders may be "passive" RFID tags or "active" RFID tags. Passive RFID tags are a type of transponder that does not contain their own power source or transmitter. When radio waves from the RFID writer reach the transponder's antenna, the energy is converted by the transponder's antenna into electricity that can power up the microchip in the tag (typically via inductive coupling). The passive RIFD tag is then able to receive and store the unique identifier to memory at the RFID tag by modulating the RFID reader's electromagnetic waves. "Active" RFID tags have their own power source and transmitter. The power source, usually a battery, is used to run the microchip's circuitry and to broadcast a signal to an RFID reader. Passive RFID tags do not have as great a range as active RFID tags, but it should be understood that either type of transponder may be employed in the present application.

The read/write module 316 may be employed by the transponder to receive the unique identifier 318 from the RFID writer 104 and uses the inductive energy from the RFID writer to write the unique identifier to the transponder when the transponder is within the RFID writer range 112. For example, in FIG. 3, transponder 106' has been placed within the RFID writer range 112 and thus, memory 206' is written with unique identifier 318 of RFID writer 104. Transponder 106" is outside of the RFID range 112 and thus, the RFID writer 104 does not write to such transponder. Similarly, transponders 106 in the shopping cart or basket 114 but outside of range 112 may not be actively written to while in the shopping cart or basket. However, prior to placing transponders 106 in the shopping cart, transponders 106 may have been placed proximate to the RFID writer 104 for a predetermined time period. As such, transponders 106 in the shopping cart or basket 114 have identifier 318 written to memory 206.

The unique identifier remains on the transponders 106 so that an RFID reader (302 of FIG. 4) can read the transponder identifier 318 and thus, remains on the transponder until another RFID writer writes over the identifier or if the transponder's memory 206 is erased.

It should be understood that the RFID writer 104 may be a RFID reader/writer that is configured to not only write to transponders but may also read the transponders.

Referring back to FIG. 1, at 58, the user may continue to add items to his shopping cart or basket 114. For each additional items selected by the user, steps 54 and 56 may be completed, namely that the item is selected and placed proximate to the RFID writer so the writer can write the same unique identifier 318 to the transponders of the additional items. This allows the same user (i.e., the first user) to have a cart or basket 114 of items with transponders having the same unique identifier (i.e., the first identifier). No other users (i.e., a second user, third user, etc.) in the store or location have items with transponders having an identifier (i.e., a second identifier, third identifier, etc.) other than the first identifier.

Figure 4:
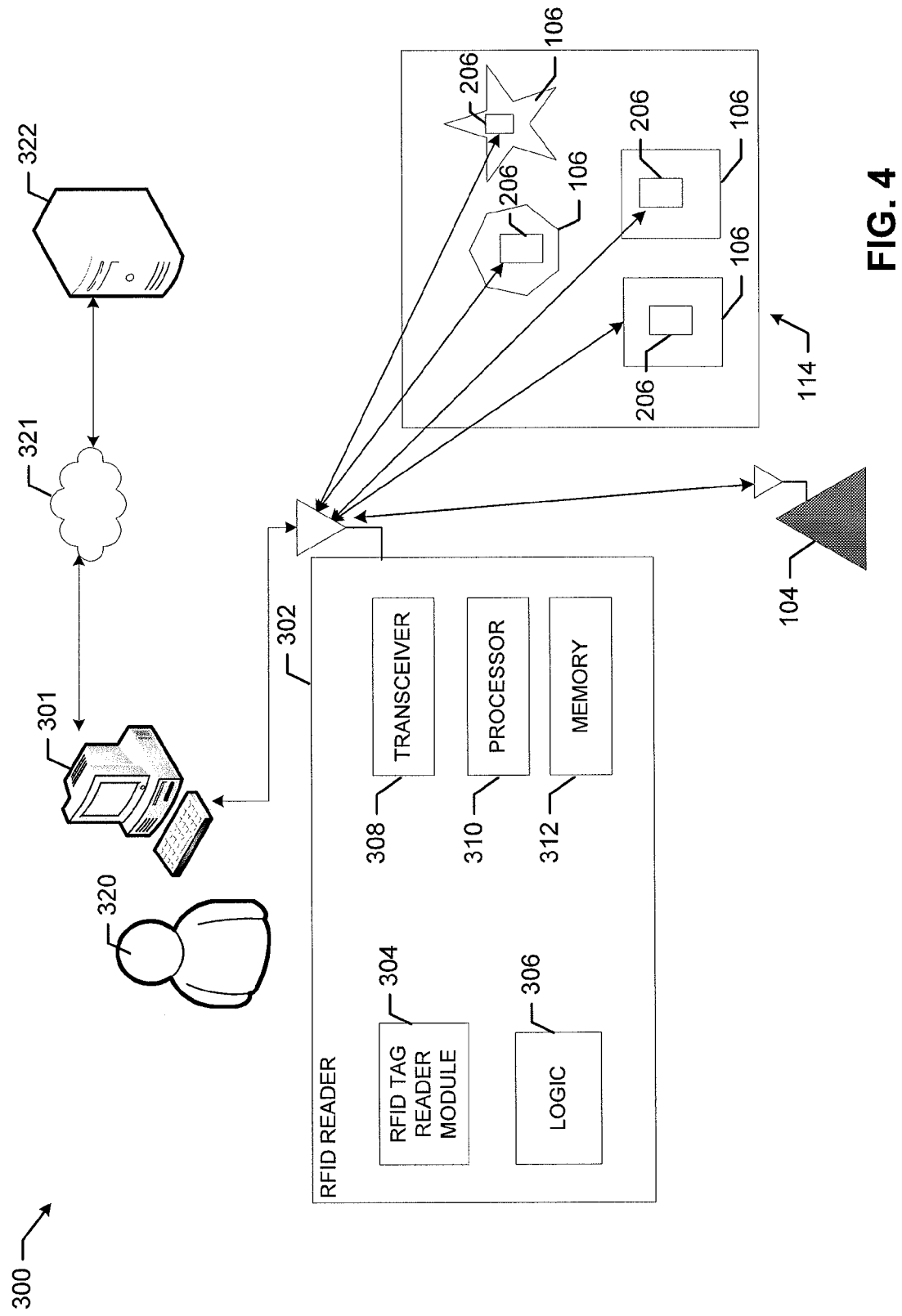
FIG. 4 illustrates a system for reading transponders having a unique identifier associated with a user according to an embodiment.

Steps 60-72 are discussed below in conjunction with FIG. 4. FIG. 4 illustrates a system 300 for reading transponders having a unique identifier according to an embodiment. The system 300 may include an RFID reader 302 and at least one transponder 106 with the unique identifier. FIG. 4 illustrates four transponders 106 each having the same unique identifier 318 written thereto.

At step 60 of FIG. 1, the RFID reader 302 receives the unique identifier 318 (i.e., the first identifier). In one embodiment, an antenna of the RFID writer 104 wirelessly transmits the unique identifier 318 to the RFID reader 302. Upon receipt, the transceiver 308 of the RIFD reader 302 may route the first identifier 318 to the processor 310 which then saves the first identifier 318 into memory 312. All other identifiers associated with other users that are stored in memory 312 are erased. In this regard, the RFID reader 302 identifies the first identifier 318 as associated with the first user that is currently "checking out." In another embodiment, a cashier or other person 320 may manually enter the first identifier 318 to the RFID reader 302 or a computer 301 associated therewith. Regardless, the first identifier 318 is stored into memory 312 and may be accessed by logic 306.

Referring back to FIG. 1, at step 62, the RFID reader 302 reads one of the transponders 106 in the user's shopping cart or basket 114. When an item having a transponder is placed near the RFID reader, the transponder receives electromagnetic signals from the RFID reader. In response to these electromagnetic signals, the transponder generates radio waves with a pattern identifying the transponder. The RFID reader's antenna receives these radio waves and transmits them to the RFID tag reader module 304, which interprets the radio waves to determine the data that the radio waves contain. Such data may include a code indicating the identity of the object as well as any identifiers appended to the code (e.g., as a prefix). The RFID reader may communication the received code with a database 322 connected to the RFID reader and/or computer 301 via a network 321. The database may include the codes related to the objects which the transponders 106 are attached. When the RFID reader reads the codes from the transponders 106, the RFID reader may look up the codes in the database. In one embodiment, the database may be resident on the RFID reader.

At step 64 of FIG. 1, the RFID reader determines if the data received from a first transponder includes an identifier. To determine this, for example, the RFID reader determines if the data has a prefix attached to the transponder code. This identifier prefix may have a starting data string which would indicate to the RFID reader (at the RFID tag reader module 304) that an identifier is included in the transmission. The identifier is then extracted from the data transmission by being the data located between the prefix starting data string to a prefix termination data string according to one embodiment. The extracted identifier then may be transmitted to logic 306 of the RFID reader 302, which compares the extracted identifier from data transmitted from the first transponder with the first identifier received from the RFID writer. If the RFID reader logic 306 determines that the transponder contains the first identifier, the method 50 may proceed to step 66; otherwise, the method 50 may continue to step 68 and may optionally provide an alert to the RFID reader operator.

At step 66 of FIG. 1, if the RFID reader's logic 306 determines from the comparison that the extracted identifier and the first identifier stored in the RFID reader memory 312 are the same, the RFID reader determines that the first transponder contains the first identifier 318 and thus, is associated with the first user. The first transponder is then assigned an "approved" status so that the item associated with the first transponder is added to a purchasing transaction. Data associated with the first transponder, such as the identity of the associated item, the price of the associated item or any other information about the item associated with the first transponder, may be transmitted to computer 301 (e.g., a cash register computing device) for further processing. For example, the item may be added to the checkout session so that the store can add the item to the purchase transaction list.

At step 68, the RFID reader (or computer 301) may mark the first transponder as having been read so that it is not read again by the RFID reader. To that end, the RFID reader may store the transponder identification code to memory 312 and/or transmit the transponder identification code to computer 301. This way, if the RFID reader accidentally scans the transponder again, the RFID reader recognizes that the transponder identification code is one that has already been scanned and thus, will not duplicate the item for the purchase transaction during the checkout session of the user.

Steps 62 through 68 may be repeated for all transponders within the RFID range of the RFID reader 302 that have not been read by the RFID reader. Thus, at step 70, the RFID reader 302 determines if any transponders have not been read by the RFID reader, and if not, the method 50 may return to step 62. Otherwise, the RFID reader 302 may indicate (e.g., via an audible or visual alert, via a message to computer 301, etc.) that the scanning for the checkout session for the first user has completed. The RFID reader 302 may transmit a list of items that were scanned and marked as "approved" to computer 301.

Thus, in light of the above, transponders, such as RFID tags, may be read when in a user's shopping cart or basket 114 so that each individual item associated with the transponders do not have to be individually handled by a checkout personnel. Transponders may be scanned by the RFID reader and the ones having the user's assigned identifier written thereto are then added to the purchase transaction.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention may be recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, 6 will begin with the words "means for".) Accordingly, the inventors reserve the right to add additional claims after filing the application to pursue such additional claim forms for other aspects of the invention.

What is claimed is:

1. A method of processing transponder signals received from transponders to identify the transponders, the method comprising:

receiving, at an RFID reader from a first transponder, a first signal comprising a first code and a first identifier, wherein the first identifier is written to the first transponder by the first RFID writer prior to purchasing a first item attached to the first transponder in response to the first transponder being placed proximate to the first RFID writer prior to the point of sale, and wherein the first identifier is used to associate transponders with a first user;

receiving, at the RFID reader from a second transponder, a second signal comprising a second code and the first identifier, wherein the first identifier is also written to the second transponder by the first RFID writer prior to purchasing a second item attached to the second transponder when the second transponder is placed proximate to the first RFID writer prior to the point of sale;

receiving, at the RFID reader, the first identifier from the RFID writer; and associating the first and second transponders with the first user based on the receiving the first identifier from both the first and second transponders.

2. The method of claim 1, further comprising:

receiving, from a third transponder, a third signal comprising a third code and a second identifier, wherein the second identifier is written to the third transponder by a second RFID writer when the third transponder is placed proximate to the second RFID writer, and wherein the second identifier is used to associate transponders with a second user; and identifying that the third transponder is associated with the second user instead of the first user based on the third transponder having the second identifier written by the second RFID writer rather than the first RFID writer.

3. The method of claim 2, further comprising:

receiving, from a fourth transponder, a fourth signal comprising a fourth code and the second identifier, wherein the second identifier is written to the fourth transponder by the second RFID writer when the fourth transponder is placed proximate to the second RFID writer; and identifying that the fourth transponder is associated with the second user.

4. The method of claim 1, wherein the associating the first and second transponders with the first user comprises identifying that the first and second transponders are grouped together due to containing the first identifier and are, thus, both associated with the first user.

5. The method of claim 1, further comprising:

providing a plurality of RFID writers comprising the first RFID writer so that the first user selects the first RFID writer prior to selecting at least one item;

allowing the first user to select a first item having the first transponder attached thereto; and writing the first identifier to the first transponder in response to the first item being selected by the user.

6. The method of claim 1, wherein the allowing the first user to select a first item comprises allowing the first user to move the item into the range of the first RFID writer.

7. The method of claim 6, wherein the range of the first RFID writer comprises a range between about one inch and about twelve inches.

8. The method of claim 7, wherein the RFID writer is removably attachable to a shopping cart or basket.

9. The method of claim 6, wherein the first RFID writer has a frequency of about 125 KHz.

10. The method of claim 1, wherein the first identifier is written to the first transponder by the first RFID writer prior to the receiving the first signal from the first transponder.

11. The method of claim 1, wherein the first code comprises data identifying a first item and the second code comprises data identifying a second item, wherein the first transponder is attached to the first item and the second transponder is attached to the second item.

12. The method of claim 1, wherein the first identifier is attached to the first code as a prefix to the first code.

13. The method of claim 1, wherein the receiving the first identifier from the first RFID writer occurs prior to the receiving the first signal.

14. The method of claim 1, further comprising scanning for transponders comprising the first identifier; and identifying all transponders comprising the first identifier.

15. An radio frequency identification (RFID) system, comprising:

an antenna to receive transponder signals;

a processing logic coupled to the antenna, the processing logic configured to:

receive, at an RFID reader from a first transponder, a first signal comprising a first code and a first identifier, wherein the first identifier is written to the first transponder by the first RFID writer prior to purchasing a first item attached to the first transponder in response to the first transponder being placed proximate to the first RFID writer prior to the point of sale, and wherein the first identifier is used to associate transponders with a first user;

receive, at the RFID reader from a second transponder, a second signal comprising a second code and the first identifier, wherein the first identifier is also written to the second transponder by the first RFID writer prior to purchasing a second item attached to the second transponder when the second transponder is placed proximate to the first RFID writer prior to the point of sale;

receive, at the RFID reader, the first identifier from the RFID writer; and associate the first and second transponders with the first user based on the first identifiers returned by the first and second transponders.

16. The radio frequency identification system of claim 15, wherein the processing logic is further configured to:

receive, from a third transponder, a third signal comprising a third code and a second identifier, wherein the second identifier is written to the third transponder by a second RFID writer when the third transponder is placed proximate to the second RFID writer, and wherein the second identifier is used to associate transponders with a second user; and identify that the third transponder is associated with the second user instead of the first user based on the third transponder having the second identifier written by the second RFID writer rather than the first RFID writer.

17. The radio frequency identification system of claim 15, wherein the processing logic is further configured to:

receive, from a fourth transponder, a fourth signal comprising a fourth code and the second identifier, wherein the second identifier is written to the fourth transponder by the second RFID writer when the fourth transponder is placed proximate to the second RFID writer; and identify that the fourth transponder is associated with the second user.

18. The radio frequency identification system of claim 15, wherein the first identifier is attached to the first code so that the first identifier comprises a prefix to the first code.

19. The radio frequency identification system of claim 15, wherein the processing logic is further configured to receive the first identifier from the first RFID writer.

20. A communication system comprising a first RFID writer configured to be associated with a first user and to write a first identifier to transponders prior to purchasing a first item attached to the first transponder in response to the transponders that come into a range of the first RFID writer prior point of sale;

a second RFID writer configured to be associated with a second user and to write a second identifier to transponders that come into a range of the second RFID writer;

wherein a RFID reader:

receives, from a first transponder, a first signal comprising the first identifier;

receives, from a second transponder, a second signal comprising the first identifier;

receives, from a third transponder, a third signal comprising the second identifier;

receives the first identifier from the first RFID writer; and groups the first transponder and second transponder as being associated with a first user due to being associated with the first identifier and the third transponder as being associated with a second user due to being associated with the second identifier.

* * * * *